B. COUSINS.
POLISH ROD HANGER.
APPLICATION FILED OCT. 22, 1920.
Reissued Dec. 7, 1920. 14,999.
Fig. 1.
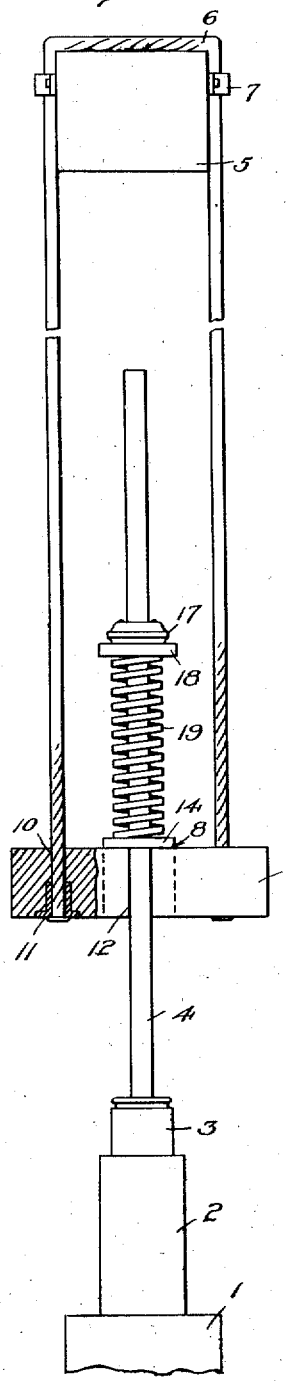
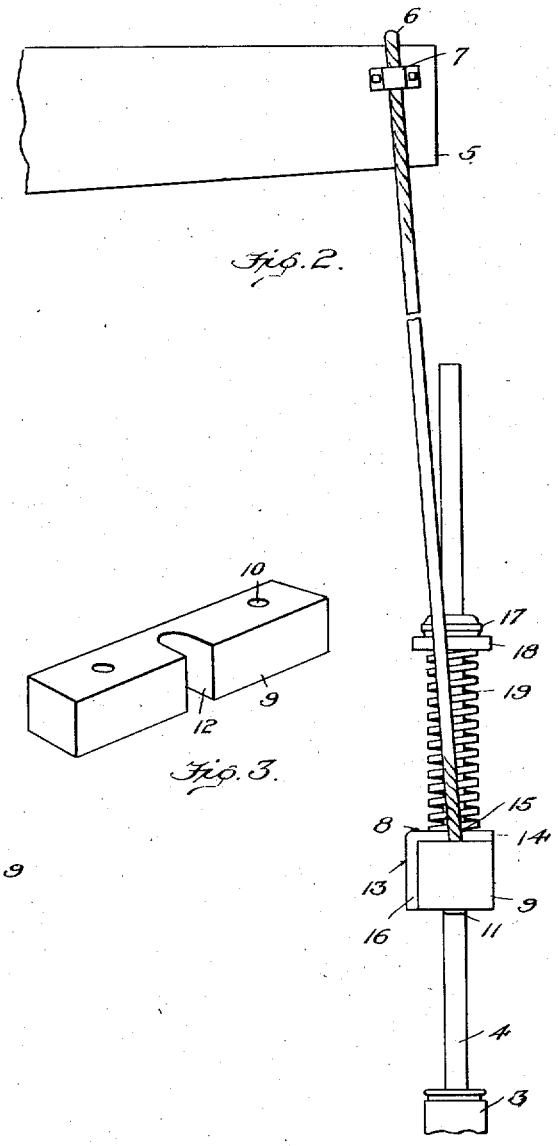
Fig. 2.
Fig. 3.
Inventor
Benjamin Cousins
By Potter & Potter
Their Attorneys

UNITED STATES PATENT OFFICE.

BENJAMIN COUSINS, OF TULSA, OKLAHOMA.

POLISH-ROD HANGER.

14,999. Specification of Reissued Letters Patent. Reissued Dec. 7, 1920.

Original No. 1,307,243, dated June 17, 1919, Serial No. 264,212, filed November 26, 1918. Application for reissue filed October 22, 1920. Serial No. 418,830.

*To all whom it may concern:*

Be it known that I, BENJAMIN COUSINS, a citizen of the United States, residing at Tulsa, in the county of Tulsa and State of Oklahoma, but formerly residing at Eldorado, in the county of Butler and State of Kansas, have invented certain new and useful Improvements in Polish-Rod Hangers, of which the following is a specification.

The present invention comprehends generally improvements in pump operating mechanism and more particularly relates to a shock absorber for the polish or sucker rod of an oil pump.

The invention has for its primary aim and object to provide a device of the above mentioned character designed to be associated with the operating mechanism of an oil or other pump for absorbing shocks and jars transmitted to the polish or sucker rod of the pump, thereby preventing breakage of the rod. A further object of the invention is to provide means whereby the polish rod of the pump may be quickly and readily connected to the pump operating mechanism or disconnected therefrom with a minimum of labor and danger. A still further object effected by my invention is to produce a simple and efficient construction reducing the liability of the polish rod being broken, bent or otherwise injured should the operating member fall as a result of accident.

More particularly, this invention contemplates the provision of a device of the above mentioned character wherein improved means is employed for yieldingly connecting the suspension cable to the sucker rod of an oil pump and is designed to absorb all shocks and jars transmitted to the rod when the walking beam or other operating member from which the cable is suspended, reaches the lowermost point of its downward stroke and starts on its upward or lifting stroke.

Among the other aims and objects of this invention may be recited the provision of a device of the above mentioned character wherein the number of parts is comparatively few, the construction simple, the cost of production low and the efficiency high.

Other objects as well as the nature, characteristis features and scope of this invention will be more readily apparent from the following description taken in connection with the accompanying drawings and pointed out in the claims forming a part of this specification.

The invention is clearly illustrated in the accompanying drawings, in which:

Figure 1 is an end elevational view showing the yielding connection between the beam and the rod.

Fig. 2 is a side elevation of the same, and

Fig. 3 is a perspective detail of the block to which the ends of the cable are connected.

Similar characters of reference are employed in all of the above described views, to indicate corresponding parts.

Referring now, more particularly, to the accompanying drawings, there is provided a pump, of the conventional type for pumping oil, et cetera, including generally a casing 1 in which is arranged a tube 2 fitted at its upper end with a stuffing box 3 while arranged through the stuffing box and operating in the tube is the polish or sucker rod 4. An operating member such as a walking beam 5 is arranged above the upper end of the rod 4, only a portion of the beam being indicated while straddled about and suspended from the outer end of the beam is a wire cable 6 held against displacement by a suitable fastener 7, the lower end portions of the cable being operably connected with the rod by means of the improved shock absorber as designated by the numeral 8.

In the present instance, the improved polish rod hanger may be said to consist of a block 9 formed desirably of steel and of an oblong configuration being provided near its respective ends with vertical openings 10 in which are anchored as at 11 the terminals of the side portions of the suspension cable 6. The block is also provided in one side face with an inwardly extending vertically disposed recess 12 which embraces the rod 4. An angle washer generally designated by the numeral 13 is now employed being formed with a horizontal attaching portion 14 having a central opening 15 therein for disposition about the rod 4 while the vertical portion is maintained in contacting relation with the side of the block opposite the recess 12 for retaining the rod against accidental displacement from the recess when the mechanism is being employed for operating the polish rod. A clamp 17 is rigidly connected to the rod near the upper end and at a point above the point of connection of the block. Disposed about the rod is a disk-like washer 18 while also disposed about the rod between the washers 13 and 18 is the resilient means proper, in the present instance in the form of an expansion coiled spring 19 the respective extremities of which exert tension against the washers corresponding in amount to the load upon the polish rod due to its own weight and that of the connected sucker rods as well as the weight of the fluid being pumped, and consequently cause the respective washers to press against the block and the clamp to normally hold these parts in spaced relation and to retain the angle washer 13 in operative position for maintaining the rod 4 in assembled relation in the recess 12 of the block 9.

In use, it is to be understood that the rod 4 is of such great length that it is in effect gravity operable on its downward stroke and is adapted to carry at its lower end a valved piston (not shown) to permit this downward movement while in addition the weight of the oil which rises in the tube facilitates the downward movement of the piston. Now when the walking beam or other operating member, reaches the lowermost point of its downward stroke and starts on its upward stroke, the sudden reverse places a severe strain on the rod and also jars the rod under ordinary conditions but in the present instance such shock or jar will be absorbed by the spring 19 which is compressed when the block 9 moves upwardly on the rod 4 and as a result prevents accidental breaking of the rod during the continual use of the device.

It is believed in view of the foregoing description that a further detailed description of the operation of the invention is entirely unnecessary. Likewise, it is believed that the advantages of the invention will be readily apparent; but it may not be amiss to call attention to the fact that my invention enables one man to disconnect the beam and polish rod with ease and safety by simply lifting the polish rod with the usual elevator the short distance necessary to relieve the retaining washer 13 from the load of the polish rod 4 and to permit said washer to be raised clear of the block 9, whereupon said block may be withdrawn laterally free of the polish rod; whereas the present well-known method of disconnecting the ordinary beam well for the purpose of pulling the rod requires that one man climb upon the walking beam for the purpose of releasing its connection with the polish rod and connecting the latter to a sucker rod elevator, while the services of a second man are needed at the engine in order to raise the elevator sufficiently to allow the walking beam to be freed from the polish rod connection, and a third man is required at the pitman end of the walking beam to raise the outer end of said beam and clear it from the polish rod connection. It also may be noted that my invention enables one man to connect the well for pumping, whereas it often requires the services of four men to connect up the usual beam well, since, in addition to the men required for performing the operations of disconnecting, the aid of an extra man upon the outer end or pumping end of the walking beam is frequently necessary in order to pull or swing the polish rod connection back into place upon the end of the beam.

Still further embodiments of the invention than those herein especially defined may be resorted to as conditions or preference may dictate, as may be in keeping with the hereto appended claims.

Having thus fully described the invention, what is claimed as new, and desired to be secured by Letters Patent, is:

1. In combination with the sucker rod of a pump, an operating member arranged above the rod and a cable suspended from the operating member, of means connected with the ends of the cable and slidably mounted on the rod, and resilient shock absorbing means associated with the upper portion of the rod and tensioned against the first mentioned means to in consequence yieldingly connect the cable with the rod.

2. The combination with the sucker rod of a pump, an operating member positioned above the sucker rod and a cable suspended from the operating member, of a clamp fastened to the rod, a block having the ends of the cable connected thereto and slidably disposed on the rod, and a coiled expansion spring disposed about the rod and interposed between the clamp and the block.

3. The combination with the sucker rod of an oil pump, an operating member arranged above the rod and a cable suspended from the rod, of a clamp rigidly connected to the rod near the upper end thereof, a block formed with vertical openings near its respective ends in which the terminals of the depending portion of the cable are anchored, the block being also provided with a vertical recess in one face for slidably engaging the block on the rod, a retaining washer engaged on the rod and engaging said block to prevent accidental displacement of the rod from said recess, another washer disposed about the rod and positioned directly beneath the clamp, and a coiled expansion spring disposed about the rod and exerting its tension against the washers and consequently against the clamp and the block for normally holding the clamp and block in spaced relation and designed to absorb all shocks likely to be transmitted to the rod when the operating member starts on its upward or lifting stroke.

4. The combination with the sucker rod of a pump and an operating member positioned above the sucker rod, of a block having a vertically extending recess which is open laterally from end to end and is adapted to receive said sucker rod, flexible means for suspending said block from said operating member, a clamp secured to said rod above said block, and means operatively interposed between said clamp and block and maintained in normal position by the load upon said rod for detachably retaining said rod in said recess.

5. The combination with the sucker rod of a pump and an operating member therefor, of a block having between its ends a recess which is open laterally from end to end and is adapted to receive said sucker rod, means for movably connecting said block to said operating member, and means operatively interposed between said rod and said block for transmitting the load upon said rod to said block and for normally retaining said rod in said recess.

6. The combination with the sucker rod of a pump and an operating member therefor, of a block having a recess which is open laterally from end to end and is adapted to receive said sucker rod, flexible means for connecting said block to said operating member, a clamp secured to said rod above said block and independent of said flexible connecting means, and means maintained in normal position by said clamp for detachably retaining said rod in said recess.

BENJAMIN COUSINS.